(12) United States Patent
Seeger et al.

(10) Patent No.: US 10,233,354 B2
(45) Date of Patent: Mar. 19, 2019

(54) SELECTIVELY STRIPPABLE COATINGS FOR METALLIC AND PLASTIC SUBSTRATES

(71) Applicant: Akzo Nobel Coatings International B.V., Arnhem (NL)

(72) Inventors: Dirk Seeger, Oldenburg (DE); Christoph Piecha, Stadland (DE); Nadine Homann, Oldenburg (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 18 days.

(21) Appl. No.: 15/316,658

(22) PCT Filed: May 21, 2015

(86) PCT No.: PCT/EP2015/061246
§ 371 (c)(1),
(2) Date: Dec. 6, 2016

(87) PCT Pub. No.: WO2015/185367
PCT Pub. Date: Dec. 10, 2015

(65) Prior Publication Data
US 2017/0204288 A1    Jul. 20, 2017

(30) Foreign Application Priority Data
Jun. 6, 2014  (EP) ..................... 14171524

(51) Int. Cl.
| | | |
|---|---|---|
| *C09D 175/06* | (2006.01) | |
| *C08G 18/42* | (2006.01) | |
| *C08G 18/44* | (2006.01) | |
| *C08G 18/78* | (2006.01) | |
| *B05D 7/00* | (2006.01) | |
| *B05D 7/02* | (2006.01) | |
| *B05D 7/14* | (2006.01) | |
| *B05D 1/36* | (2006.01) | |
| *B05D 3/00* | (2006.01) | |
| *C08G 18/00* | (2006.01) | |
| *C09D 175/04* | (2006.01) | |
| *C08K 3/04* | (2006.01) | |
| *C08K 3/22* | (2006.01) | |
| *C08K 3/32* | (2006.01) | |
| *C08K 3/34* | (2006.01) | |

(Continued)

(52) U.S. Cl.
CPC ............. *C09D 175/06* (2013.01); *B05D 1/36* (2013.01); *B05D 3/007* (2013.01); *B05D 7/02* (2013.01); *B05D 7/14* (2013.01); *B05D 7/54* (2013.01); *B05D 7/572* (2013.01); *C08G 18/003* (2013.01); *C08G 18/42* (2013.01); *C08G 18/44* (2013.01); *C08G 18/7831* (2013.01); *C09D 175/04* (2013.01); *C08G 2150/90* (2013.01); *C08K 3/04* (2013.01); *C08K 3/22* (2013.01); *C08K 3/32* (2013.01); *C08K 3/346* (2013.01); *C08K 3/36* (2013.01); *C08K 9/06* (2013.01); *C08K 2003/2241* (2013.01); *C08K 2003/2268* (2013.01); *C08K 2003/328* (2013.01)

(58) Field of Classification Search
CPC ...... C08G 18/003; C08G 18/42; C08G 18/44; C08G 18/572; C08G 2150/90; C09D 175/04; C09D 175/06; C08K 2003/2241; C08K 2003/2268; C08K 2003/328; C08K 3/04; C08K 3/22; C08K 3/32; C08K 3/346; C08K 3/36; C08K 9/06; B05D 1/36; B05D 3/007; B05D 7/02; B05D 7/14; B05D 7/54; B05D 7/572
USPC ...... 528/65; 428/423.1, 423.3, 425.8, 425.9; 427/299, 372.2
See application file for complete search history.

(56) References Cited

U.S. PATENT DOCUMENTS 5,349,041 A * 9/1994 Blum ................. C08G 18/0823
                                                     525/440.02
6,482,885 B1   11/2002 Müller et al.
(Continued)

FOREIGN PATENT DOCUMENTS

| DE | 25 28 943 A1 | 12/1976 |
| EP | 1 072 652 A2 | 1/2001 |
| WO | WO 2012/032113 A1 | 3/2012 |

OTHER PUBLICATIONS

International Search Report dated Aug. 24, 2015 in PCT/EP2015/061246 (with English language translation).
(Continued)

*Primary Examiner* — Thao T Tran
(74) *Attorney, Agent, or Firm* — McDonnell Boehnen Hulbert & Berghoff LLP

(57) ABSTRACT

The invention relates to a coating material composition comprising at least one hydroxyl-containing polyester (A) having an OH number of 250 to 660 mg KOH/g, at least one polycarbonate diol (B) having an OH number of 35 to 500 mg KOH/g, in an amount of 1 to 20 wt %, based on the overall formula, and at least one polyisocyanate (C) containing biuret groups and having an isocyanate group content of 5.8 to 27 wt %, the hydroxyl-containing polyester (A) being different from the polycarbonate diol (B), and the coating material composition possessing a fraction of organic solvents of less than 420 g/l, and comprising, based on the solids content, 40 to 100 wt % of binders. The invention further relates to a method for producing a multicoat coating using a coating material composition of the invention, to the use of the coating material composition, and to substrates coated therewith.

20 Claims, No Drawings

(51) Int. Cl.
    *C08K 3/36*    (2006.01)
    *C08K 9/06*    (2006.01)

(56) References Cited

U.S. PATENT DOCUMENTS

| 2005/0027095 | A1* | 2/2005 | Wamprecht | C08G 18/4202 |
| | | | | 528/44 |
| 2007/0054134 | A1* | 3/2007 | Niesten | C08G 18/61 |
| | | | | 428/447 |
| 2012/0163981 | A1 | 6/2012 | Hong | |

OTHER PUBLICATIONS

International Preliminary Report on Patentability and Written Opinion dated Dec. 6, 2016 in PCT/EP2015/061246 (with English language translation).

* cited by examiner

SELECTIVELY STRIPPABLE COATINGS FOR METALLIC AND PLASTIC SUBSTRATES

FIELD OF THE INVENTION

The present invention relates to selectively strippable, mechanically and chemically resistant coatings for metallic and plastic substrates, and also to the coating materials needed in order to produce them. The invention further relates to a method for producing such coatings, and to the use of the coating materials for coating metallic and plastic substrates, particularly in the sector of airplane finishing.

PRIOR ART

Across various areas of use there is a requirement for coatings which satisfy exacting mechanical demands. Examples here include surfaces which in terms of the ambient conditions are exposed to high speeds in conjunction with exposure to erosive substances, such as solids or liquids. Erosive exposure is experienced in principle by objects which, firstly, themselves are moving, such as rotor blades of wind energy systems or helicopters and ship's screws, air and land vehicles (such as airplanes, rail vehicles, automobiles, for example), and ships.

Fundamentally, erosion can be brought about by liquid or solid substances which are present themselves or dispersely or in solution in another gaseous or liquid medium (for example, air or water) and which are moved by this medium (for example, airborne sand, rain). When these substances strike objects, they exert an erosive force on them. Examples of this are the erosion due to rain or airborne sand on rotor blades or in the region of the slats on airplanes. In general terms the possibility exists of controlling wear protection, such as the erosion resistance of coatings, for example, by means of various measures. For example, the film thickness of the coating can be increased. For reasons of weight, however, there are many applications where this is undesirable, such as in airplane construction or rotor blade construction of wind turbines, for example. Another possibility is to use resins with aromatic resin constituents, such as epoxy resins, for example, in the coating materials. As a result of the aromatic molecular constituents, the wear resistance afforded by the resultant coatings is high, but their UV stability is significantly restricted. It is possible, furthermore, to employ coating materials comprising resins which allow high crosslinking densities to be obtained, induced by light or by temperature. For example, UV resins (via radical or ionic polymerization) or certain high-reactivity polyaddition resins may be used. These classes of binder can likewise be employed to enhance the wear resistance, but there are limiting factors in the context of their use on large components such as rotor blades or airplane components. Accordingly, in the case of formulations comprising UV resins, for example, the selection of pigments is limited, since they may have absorption maxima in curing wavelengths and the levels of pigmentation impose limits on the film thicknesses. Equipment-related challenges are imposed, moreover, by the oxygen inhibition of the UV initiators. When using thermosetting paints, such as polyurethane-based baking varnishes, for example, the limitation lies above all in the baking temperatures in relation to the size of equipment for large components. The objective is therefore to meet the demand for coatings which offer excellent erosion resistance and thereby to minimize expensive maintenance and repair intervals.

The surfaces to be coated in airplane construction consist predominantly of light metals such as, for example, aluminum, magnesium and titanium, and their alloys, though to a lesser extent also steel and fiber-reinforced plastics. While an airplane finish in flight operation is required to withstand extreme loads—for example, the erosion exposures associated with the high speeds; temperature differences of more than 100° C.; and high UV loads—it must also, furthermore, be resistant to aggressive chemicals, examples being the service fluids used such as kerosene, hydraulic fluids, and oils, but also deicing fluids and battery acid.

Particularly in the area of airplane finishing, therefore, there are both mechanical and chemical requirements to be met. Nevertheless, the high safety standards of air travel require checking of the airplane bodies at regular intervals for maintenance and upkeep. As part of the maintenance of an airplane, there are not only, on the one hand, repairs carried out to paint damage, but also, on the other hand, extensive paint removal operations, going even as far as complete paint removal, in order to allow the airplane body to be investigated for traces of corrosion or wear.

Particularly in the case of the composite materials, such as the fiber-reinforced plastics, but also, in some cases, with the metal surfaces as well, paint removal still always involves the coats of paint being mechanically abraded—an operation associated on the one hand with great consumption of time and on the other hand with a not inconsiderable dust load. High-pressure water removal of paint, introduced at one time for reasons of environmental protection, is no longer being employed, owing to excessive mechanical loads. The current paint removal means of choice is chemical stripping. In this procedure, a water-based, alkaline benzyl alcohol/formic acid mixture is applied airlessly in order to cause swelling of the paint films. Swollen residues of paint are then rinsed off with water, along with stripper, before an aqueous-alkaline neutralization and cleaning procedure is performed. Before being recoated, the surface is cleaned manually with solvents, particularly butyl acetate/isobutanol mixtures.

Typical coating material compositions which are employed in airplane finishing and which satisfy the durability requirements outlined above are based on chemically crosslinking systems. They include, in particular, the 2-component coating materials based on epoxy resins and amine adducts and/or amidoamines as hardeners.

Existing paint systems, however, frequently contain a high level of volatile organic solvents—a level which is to be reduced to a minimum from the standpoint of the environment. Desirable, for example, is a solvent fraction in the completed coating material that is not higher than 420 g/l, preferably not higher than 350 g/l.

WO-A-2012/032113 discloses erosion-control coatings based on a polyol component and on a polylactone component terminated with isocyanate groups.

Problems

The problem addressed by the present invention was that of eliminating the above-described disadvantages of the prior art. The intention more particularly was to provide coating material compositions which are mechanically and chemically resistant, especially to wind erosion and rain erosion and to service fluids as used in airplane operation, but which on the other hand are also selectively strippable with benzyl alcohol-based stripping media for the purpose of substrate maintenance. The coatings produced from the coating materials are to possess excellent adhesive strength on metallic substrates such as steel or nickel, but also light metals such as aluminum, magnesium, and titanium, and to plastic substrates as well, such as fiber-reinforced plastics in particular. The coating materials ought to be resistant to weathering, particularly with regard to UV radiation and moisture. The coating materials ought also to be easy to produce and easy to apply even with large components such as rotorblades of wind turbines or airplanes.

In order to achieve selective strippability, the systems presently employed are based on polyamides, which are used in one- or two-component form and which have hitherto been employed in paint systems predominantly containing alcohol. These alcohol-containing systems are incompatible with other 2-component polyurethane systems, with epoxy resin-based systems, or with water-thinnable paint systems. A new coating material system ought not to have these disadvantages, so removing the need for costly and inconvenient changes of apparatus or washing of the application apparatus.

In the aircraft sector, a further disadvantage of selectively strippable coating systems comprising polyamide is that, in accordance with the routine standards such as AMS 3095, they are only just still acceptable in service media such as kerosene, air fuel, or hydraulic fluids. A new coating material system ought therefore to show significantly improved results as well in the scratch hardness testing before and after exposure to aforementioned service media.

Solution to the Problem

The problems addressed by the present invention have surprisingly been solved through provision of a coating material composition which comprises
(i) at least one hydroxyl-containing polyester (A) having an OH number of 250 to 660 mg KOH/g,
(ii) at least one polycarbonate diol (B) having an OH number of 35 to 500 mg KOH/g, in an amount of 1 to 20 wt %, based on the total weight of the completed coating material composition, and
(iii) at least one polyisocyanate (C) containing biuret groups and having an isocyanate group content of 5.8 to 27 wt %,
the hydroxyl-containing polyester (A) being different from the polycarbonate diol (B), and the coating material composition
(iv) possessing a fraction of organic solvents of less than 420 g/l, and
(v) comprising, based on the solids content, 40 to 100 wt % of binders.

Binders in the sense of the present invention constitute the nonvolatile fraction (i.e., solids content) of the coating material minus pigments and fillers. The binders therefore also include, for example, crosslinking agents and additives such as, for example, wetting and/or dispersing agents, defoamers, flow control additives, rheological additives, or catalysts, provided they are not volatile under the conditions for determining the binder content. The binder content of a coating material can be determined by first ascertaining the solids content (drying at 105° C. for 60 minutes) and then carrying out incineration of the sample (120 minutes at 450° C.). The difference in weight between drying at 105° C. for 60 minutes and incineration at 450° C. for 120 minutes corresponds to the binder fraction. Comparing the weighed amount of coating material composition with the binder fraction quantity as determined above produces, in the form of a ratio, the percentage binder fraction of the coating material composition.

The solids content of the coating material composition is determined by drying 1 g of the coating material composition at 105° C. for 60 minutes. The nonvolatile fraction remaining after drying is expressed as a ratio relative to the initial mass, and indicates the percentage solids content of the coating material composition.

The binder fraction in the solids content of the coating material composition of the invention is 40 to 100 wt %, preferably between 60 and 80 wt %. If the binder fraction in the solids content is 100 wt %, this means that the solids content comprises neither pigments nor fillers. In a case of this kind, the coating material is a clearcoat material. If the binder fraction in the solids content is only 40 wt %, this means that the solids content comprises 60 wt % of pigments and/or fillers. In such a case, the coating material is a primer or a topcoat material. The coat construction of a typical multicoat paint system, including in particular in the airplane finishing sector, comprises—starting from the substrate—at least one primer coat, at least one topcoat, and one or more optional clearcoats. Typically, the binder fraction of the solids content decreases from the clearcoat toward the primer coat, meaning that the fraction of the pigments and fillers goes up. Depending on whether the coating material composition of the invention is used as a primer composition or as a topcoat or clearcoat material, therefore, it contains 0 to 60 wt % of (D) pigments and/or fillers.

The hydroxyl number (OH number) of the polymers used is determined in accordance with DIN EN ISO 4629.

The isocyanate group content of the polyisocyanates used is determined in accordance with DIN EN ISO 11909.

All percentage figures and figures for physical parameters with regard to the stated components (A), (B), and (C) and also to the components (D), (E), and (F) recited below pertain—as is usual—to the respective component without its organic solvent fraction, unless expressly stated otherwise. Where, for example, a coating material composition of the invention comprises 10 wt % of a commercial formulation of a hydroxyl-containing polyester (A), which comprises the hydroxyl-containing polyester in the form of a 50 weight percent strength solution in butyl acetate, this means that the coating material composition of the invention comprises 5 wt % of the hydroxyl-containing polyester (i.e., 50 wt % of 10 wt %). The butyl acetate introduced by way of the commercial formulation is therefore not a percentage constituent of component (A), but is instead counted as part of the organic solvent fraction.

The term "organic solvent" used herein corresponds to that in Council Directive 1999/13/EC of Mar. 11, 1999 (published in the Official Journal of the European Communities on Mar. 29, 1999). Accordingly, an "organic solvent" is a "volatile organic compound", which, without being chemically altered, alone or in combination with other substances, dissolves raw materials, products or wastes or is used as a cleaning product to dissolve soiling, as a solvent, as a dispersion medium, or as an agent for adjusting the viscosity or the surface tension, or as a plasticizer or preservative. The aforementioned Directive defines a "volatile organic compound" as an "organic compound" which has a vapor pressure of 0.01 kPa or more at 293.15 K or has a corresponding volatility under the particular conditions of use. An "organic compound", in turn, is a compound which comprises at least carbon and one of the elements from hydrogen, halogens, oxygen, sulfur, phosphorus, silicon, or nitrogen, or two or more thereof, with the exception of carbon oxides and also of inorganic carbonates and bicarbonates.

Organic Solvents

The coating material compositions of the invention are preferably solvent-based, with the fraction of organic solvents being less than 420 g/l, preferably less than 350 g/l. The organic solvents content is customarily 100 to 420 g/l, preferably 200 to 350 g/l. Organic solvents which can be used are, for example, the customary paint solvents. In their chemical behavior they are substantially inert toward the other paint constituents, and form part of the volatile fraction of the coating material. Particularly suitable organic solvents are aprotic solvents. Especially suitable are esters, more particularly esters of acetic acid such as, for example, $C_{1-4}$ alkyl esters of acetic acid or $C_{1-4}$ alkoxyalkyl esters of acetic acid. Examples of especially suitable esters as solvents are butyl acetate, 1- and 2-methoxypropyl acetate, and 3-methoxy-n-butyl acetate. Further especially suitable organic solvents are ketones such as, for example, methyl isobutyl ketone or diketones such as acetylacetone. Furthermore, the coating material composition of the invention may also comprise hydrocarbons as solvents, such as, for example, aromatic hydrocarbons such as Shellsol A or alkylbenzenes such as xylene and toluene.

Hydroxyl-Containing Polyester (A)

The coating material composition of the invention comprises at least one hydroxyl-containing polyester (A) having an OH number of 250 to 660 mg KOH/g, preferably 250 to 500 mg KOH/g, and more preferably 380 to 460 mg KOH/g. If the OH number is below 250 mg KOH/g, there is a fall in the chemical resistance and resistance to service media in certain cases. The hydroxyl-containing polyester (A) is preferably a polyester containing no aromatic groups. The polyesters (A) are prepared preferably from polyols and polycarboxylic acids. The hydroxyl-containing polyester (A) is preferably branched. In one especially preferred embodiment it is a branched, hydroxyl-containing polyester which is free from aromatic groups. Suitable hydroxyl-containing polyesters are available, for example, among the Desmophen® product line from Bayer MaterialScience AG (Leverkusen, Germany).

In the coating material compositions of the invention, the hydroxyl-containing polyester (A) is included preferably in an amount of 8 to 50 wt %, based on the total weight of the completed coating material composition. More preferably the coating composition of the invention, based on the total weight of the completed coating material composition, comprises the hydroxyl-containing polyester (A) in an amount of 8 to 25 wt %, very preferably of 9 to 23 wt %, such as, for example, 9 to 14 wt % or 14 to 23 wt %. Primer compositions and adhesion-promoting compositions preferably comprise the hydroxyl-containing polyester (A) in an amount from 9 to 14 wt %, based on the total weight of the completed coating material composition, whereas, preferably, basecoat compositions, topcoat compositions, and clearcoat compositions comprise the hydroxyl-containing polyester (A) in an amount from 14 to 23 wt %, based on the total weight of the completed coating material composition.

All weight percentage ranges also apply if, for example, only one single hydroxyl-containing polyester (A) is employed; they apply thereto in particular when this polyester (A) is a preferred hydroxyl-containing polyester (A). The hydroxyl-containing polyesters that are no longer claimed in the case of restriction to preferred hydroxyl-containing polyesters (A) may continue to be present in the composition, but together with the preferred embodiments claimed they do not exceed the original weight percentage ranges. In the case of a restriction to preferred hydroxy-functional polyesters (A), it is more preferable for only such polyesters to be present in the coating material composition.

Polycarbonate Diol (B)

As a further essential constituent, the coating material composition of the invention comprises at least one polycarbonate diol (B) having an OH number of 35 to 500 mg KOH/g, preferably 50 to 400 mg KOH/g, more preferably 80 to 300 mg KOH/g, and very preferably 100 to 250 mg KOH/g, such as, for example, 150 to 200 mg KOH/g.

The polycarbonate diol (B) is preferably free from aromatic groups. Preferably the polycarbonate diol (B) is a linear polycarbonate diol. The polycarbonate diol is preferably hydroxy-terminated at both ends. In one very particular embodiment the polycarbonate diol (B) is a linear, hydroxy-terminated, aliphatic polycarbonate diol. It possesses in turn, very preferably, an OH number of 100 to 250 mg KOH/g such as, for example, 150 to 200 mg KOH/g.

Suitable polycarbonate diols (B) are available, for example, among the Desmophen® C product line from Bayer MaterialScience AG (Leverkusen, Germany). Preferred in turn among the polycarbonate diols (B) are those which apart from carbonic ester groups contain no other ester groups. Preferred polycarbonate diols may be prepared preferably by transesterification of diaryl carbonates or dialkyl carbonates with diols. Especially preferred are polycarbonate diols (B) prepared with 3-methyl-1,5-pentanediol or 1,6-hexanediol as diols.

In the coating material compositions of the invention, the polycarbonate diol (B) is present in an amount of 1 to 20 wt %, based on the total weight of the completed coating material composition. Based on the total weight of the completed coating material composition, the coating composition of the invention preferably comprises the polycarbonate diol (B) in an amount of 2 to 14 wt %, very preferably in an amount of 6 to 12 wt %.

All weight percentage ranges also apply if, for example, only one polycarbonate diol (B) is employed; they apply thereto in particular when this polycarbonate diol (B) is a preferred polycarbonate diol (B). The polycarbonate diols that are no longer claimed in the case of restriction to preferred polycarbonate diols (B) may continue to be present in the composition, but together with the preferred embodiments claimed they do not exceed the original weight percentage ranges. In the case of a restriction to preferred polycarbonate diols (B), it is more preferable for only such polycarbonate diols to be present in the coating material composition.

If the fraction of the polyester (A) in relation to the polycarbonate diol (B) is lowered, then the chemical resistance drops.

If the polycarbonate diol content is below 6 wt %, based on the total weight of the completed coating material composition, then the elasticity drops, and for a given application viscosity the amount of organic solvents is customarily higher. The selectivity of the strippability also drops. If the polycarbonate diol content rises above 12 wt %, based on the total weight of the completed coating material composition, then there is a drop in the resistance to service media. Service media include, in particular, kerosene (aliphatics and aromatics), air fuel, Skydrol, or other hydraulic fluids, deicers (alkali metal salts of lower carboxylic acids in the form of a solution), toilet fluids, and cleaning products such as soaps, for example.

Polyisocyanate (C) Containing Biuret Groups

The coating material composition of the invention further comprises at least one polyisocyante (C) containing biuret groups and having an isocyanate group content of 5.8 to 27 wt %, preferably 15 to 26 wt %, and more preferably 20 to 26 wt %. This may be an aromatic or aliphatic polyisocyanate. The polyisocyanate containing biuret groups is preferably an aliphatic polyisocyanate. The aliphatic polyisocyanates containing biuret groups are obtained by oligomerization with biuret formation from, for example, 1,6-hexamethylene diisocyanate (HDI), 1,3-cyclohexyl diisocyanate, 1,4-cyclohexyl diisocyanate (CHDI), diphenylmethane diisocyanates, 2,2,4- and/or 2,4,4-trimethyl-1,6-hexamethylene diisocyanate, dodeca-methylene diisocyanate, isophorone diisocyanate (IPDI). For example, three molecules of HDI react with one molecule of water to form an HDI biuret, with elimination of one molecule of carbon dioxide.

Employed with particular preference are biurets of aliphatic polyisocyanates based on isophorone diisocyanate and/or hexamethylene diisocyanate, very particular preference being given to a biuret of hexamethylene diisocyanate.

The polyisocyanate (C) containing biuret groups is present in the coating material compositions of the invention preferably in an amount of 20 to 45 wt %, based on the total weight of the completed coating material composition. Based on the total weight of the completed coating material composition, the coating composition of the invention more preferably comprises the polyisocyanate (C) containing biuret groups in an amount of 20 to 40 wt %, very preferably in an amount of 20 to 30 wt % or 30 to 40 wt %.

All weight percentage ranges also apply if, for example, only one polyisocyanate (C) containing biuret groups is employed; they apply thereto in particular when this polyisocyanate (C) containing biuret groups is a preferred polyisocyanate (C) containing biuret groups. The polyisocyanates containing biuret groups that are no longer claimed in the case of restriction to preferred polyisocyanate (C) containing biuret groups may continue to be present in the composition, but together with the preferred embodiments claimed they do not exceed the original weight percentage ranges. In the case of a restriction to preferred polyisocyanates (C) containing biuret groups, it is more preferable for only such polyisocyanates (C) containing biuret groups to be present in the coating material composition.

For the invention it is vital to use polyisocyanates (C) containing biuret groups. Polyisocyanates based on isocyanurates, for example, have proven inadequate especially with regard to the selectivity of the strippability. It is, however, in particular the combination of the polyisocyanates (C) containing biuret groups with the polycarbonate diols (B) that ensures the surprisingly high selectivity.

Pigments and Fillers (D)

Pigments according to DIN EN ISO 4618 are colorants consisting of fine particles which are insoluble in the liquid phase of the coating material and are used for their optical, protective and/or decorative qualities.

The term "colorant" here includes black or white colorants. Preferred pigments are color-imparting pigments and/or effect-imparting pigments, and anticorrosion pigments. Effect-imparting pigments are those which impart an optical effect deriving in particular from reflection of light. Typical effect-imparting pigments in the sense of the present specification are pearlescent pigments or metallic pigments. Additionally, however, it is possible to use magnetically shielding, electrically shielding, fluorescent, phosphorescent, and, in particular, corrosion-inhibiting pigments.

Fillers, in contrast, according to DIN EN ISO 4618, are materials in granular or powder form which are insoluble in the liquid phase of a coating material and are used in order to achieve or influence particular physical qualities. Since in terms of their intended use there may be overlaps between pigments and fillers, it is common to cite the refractive index. For fillers this index is below 1.7, and so this class of product does not achieve any notable scattering and hiding power. For the purposes of the present invention, however, no differentiation is absolutely necessary.

The chemical nature of the pigments and/or fillers (D) is not critical here—they may be organic or inorganic pigments and/or organic or inorganic fillers. For the use of the coating material composition of the invention as a primer, however, particular preference is given to inorganic pigments and/or inorganic fillers. To increase the corrosion control it is possible to make use, for example, of anticorrosion pigments, such as zinc phosphate, zinc chromate, or strontium chromate, for example, with zinc phosphate being preferred on environmental grounds. With particular advantage, therefore, the coating material compositions are free from chromium (VI) compounds.

Further typical pigments which can be employed in the coating materials of the invention are white pigments such as titanium dioxide or black pigments such as pigmentary carbon blacks, for example. Fillers used may be, for example, calcium carbonates, barium sulfates, and preferably silicates such as talcs, for example, or silicas such as precipitated silicas or fumed silicas, for example. The fillers employed are preferably hydrophobic. Silicas with a thickening effect are likewise included herein among the fillers.

Component (E)—Epoxy Resins and Mixtures Thereof with Hydroxy-Functional Acrylic Resins The coating material composition of the invention preferably comprises as a further component (E) at least one epoxy resin reactive toward isocyanate groups, or the mixture of at least one hydroxy-functional acrylic resin with at least one epoxy resin. The term "acrylic resin", here and in the art more usually, includes those resins which may comprise methacrylates or other ethylenically unsaturated monomers in copolymerized form. Especially preferred for use in the context of the present invention are epoxy resins (E) which are preferably hydroxy-functional. One particularly preferred embodiment uses a mixture of a hydroxyl-functional epoxy resin with a hydroxy-functional acrylic resin as component (E).

The fraction of component (E) in the coating material compositions of the invention is preferably 0 to 6 wt %, more preferably 1.0 to 5.0 wt %, and very preferably 1.5 to 4.5 wt %, based in each case on the total weight of the completed coating material composition. The use of amounts above 6 wt %, based on the total weight of the completed coating material composition, lowers the flexibility of the coating and also the selectivity of the strippability.

All weight percentage ranges also apply if, for example, only one species is used as component (E); they apply to these species and especially so when the species in question is a preferred species of component (E). The resins of component (E) that are no longer claimed in the event of restriction to preferred species (E) may continue to be present in the composition, but together with the claimed preferred embodiments do not exceed the original weight percentage ranges. In the event of restriction to preferred species of component (E), it is particularly preferred for only such species to be present in the coating material composition.

Reactivity toward isocyanate groups is realized in particular through hydroxyl groups in component (E).

The OH content of the hydroxy-functional acrylic resins which may be used in a mixture with the epoxy resins is preferably at least 1 wt %, more preferably at least 3 wt %, and preferably not more than 8 wt %, better still not more than 6 wt %, based on the solids content of the acrylic resin. Preferably these are copolymers of nonhydroxy-functional monomers with hydroxy-functional acrylic esters and also, optionally, nonacrylic ethylenically unsaturated monomers.

The epoxy resins are preferably epoxy resins which terminally each contain an epoxide group and in the polymeric backbone contain free hydroxyl groups, which serve for reaction with isocyanate groups. The OH content of the epoxy resins is preferably 1 to 6 wt %, more preferably 1 to 3 wt %, based on the solids content of the epoxy resin.

Particularly preferred, though not limited thereto, is the use of component (E) in coating material compositions which serve for the coating of metallic substrates, more particularly stainless steel substrates. In such compositions, component (E) is particularly advantageous in its effect on the adhesion of the cured coating film to the substrate.

Further Components (F)

Lastly, the coating material compositions of the invention may also, additionally, comprise further constituents (F) as binders, different from components (A), (B), (C), (D), and (E), and from the organic solvents. These constituents (F) comprise further binders, including binders with specific functions, as for example typical coatings additives such as antioxidants, deaerating agents, wetting agents, dispersants, flow control agents, and defoamers, examples being those with a polysiloxane basis, adhesion promoters, examples being those with a silane basis, rheological assistants such as thickeners, antisag agents and thixotropic agents, waxes and waxlike compounds, biocides, matting agents, radical scavengers, light stabilizers, preferably UV absorbers with an absorption maximum below 370 nm and/or sterically hindered amines (HALS), corrosion inhibitors, flame retardants, or polymerization inhibitors, and also soluble dyes or catalysts, examples being those based on tin compounds, molybdenum compounds, zirconium compounds, or zinc compounds, or amine catalysts. Particularly suitable catalysts are tin compounds such as dimethyltin dilaurate or dibutyltin dilaurate, which, like all aforementioned catalysts, catalyze a reaction between the polyisocyanates (C) containing biuret groups and the hydroxyl-containing components (A) and (B).

The constituents (F) are used in total preferably in the amounts customary for them, of 0 to 10 wt %, more preferably 0 to 5 wt %, and very preferably 0.1 to 4 wt %, based on the total weight of the completed coating material composition.

The molar ratio of the sum of all the hydroxyl groups in the hydroxyl-containing polyesters (A), in the polycarbonate diols (B), and in the resins (E) to the sum of the isocyanate groups in the polyisocyanate (C) containing biuret groups is preferably 1:1 to 1:1.5, more preferably 1:1.1 to 1:1.4, and very preferably 1:1.15 to 1:1.3.

In one particularly preferred embodiment of the invention the coating material composition of the invention comprises
  (i) at least one hydroxyl-containing, branched, aliphatic polyester (A) having an OH number of 250 to 440 mg KOH/g,
  (ii) at least one linear, aliphatic polycarbonate diol (B) having an OH number of 100 to 250 mg KOH/g, in an amount of 2 to 15 wt %, based on the total weight of the completed coating material composition,
  (iii) at least one aliphatic polyisocyanate (C) containing biuret groups and having an isocyanate group content of 15 to 25 wt %,
  (iv) at least one pigment and/or one filler (D) in an amount of 0 to 30 wt %, based on the total weight of the completed coating material composition,
  (v) at least one component (E) in a total amount of 0 to 6 wt %, preferably 1 to 5 wt %, based on the total weight of the completed coating material composition, said component (E) comprising an epoxy resin or a mixture of an epoxy resin and a hydroxy-functional acrylate resin, or consisting of an epoxy resin and of a hydroxy-functional acrylate resin,
  (vi) at least one further component (F), different from (A), (B), (C), (D), and (E) and from organic solvents, in an amount of 0 to 10 wt %,
  the hydroxyl-containing polyester (A) being different from the polycarbonate diol (B),
  the ratio of the hydroxyl groups from (A), (B), and (E) to the isocyanate groups from (C) being 1:1.15 to 1:1.30,
  and the coating material composition
  (vii) possessing a fraction of organic solvents of less than 420 g/l, and
  (viii) comprising 40 to 75 wt % of binders, based on the total weight of the completed coating material composition.

Further Subjects of the Invention

The coating material is used preferably for producing a selectively strippable paint coat in multicoat coating systems.

The composition of the invention may be used as Original Equipment Manufacturer (OEM) paint or as refinish paint.

The invention further provides a method for producing a multicoat coating system which is obtainable by applying at least one primer composition to a metallic substrate and/or plastic substrate, applying at least one topcoat composition or basecoat composition thereto, and optionally by applying at least one clearcoat composition thereto, where at least one of the primer compositions, topcoat compositions, or clearcoat compositions is a coating material composition of the invention, and the coating material composition is subsequently crosslinked chemically.

The coating material composition of the invention is used preferably for producing a primer coat. The composition of the invention may also be used in the multicoat paint system of the invention itself for producing an intermediate coat or topcoat. The coating material composition of the invention may also be employed as a clearcoat material, to form the outermost coat.

Further provided by the invention, accordingly, is the use of a coating material composition of the invention as a primer composition, topcoat composition, or clearcoat composition for the coating of metallic substrates and/or plastic substrates, the substrates comprising preferably an airplane body or a part of an airplane body, a wind turbine and/or rotorblades, a ship's hull or a part thereof, or (large) machinery.

The compositions of the invention may be applied by the customary methods such as spraying (e.g., airless, airmix, compressed air, hot spraying methods, or induction mixing), rolling, roller coating, brushing, or via a cartridge. Preferably the coating compositions of the invention are sprayed, roller-coated, or applied via a cartridge.

The compositions of the invention are applied preferably so as to result in a dry film thickness of 5 μm to 250 μm. The dry film thickness is more preferably 5 μm to 120 μm, very preferably 5 μm to 25 μm.

Depending on area of application, preferred dry film thicknesses are 10 to 100 μm for primers, 5 to 40 μm for intermediate coats, 20 to 250 μm for topcoats, and 5 to 60 μm for clearcoats.

Curing of the coating material composition of the invention is accomplished preferably by chemical crosslinking, more preferably at a temperature of up to 60° C. Particularly preferred is a temperature range from 15 to 60° C., especially from 18 to 50° C. Thermal curing takes place preferably for a time of 30 to 90 minutes at 40° C. to 60° C. or 4 to 6 hours at 15° C. to 25° C. Complete through-curing is accomplished typically after about 1 week at 20° C. The skilled person then refers to the "development of the ultimate properties".

For the drying and/or conditioning of the wet films, preference is given to drying at room temperature (25° C.), or thermal drying at a temperature higher than room temperature, and/or drying by means of convection methods, are or is used, in which case customary and known devices such as continuous ovens, NIR and IR heaters, fans, and blowing tunnels may be employed. These devices, and hence also the drying techniques, can be combined with one another. The multicoat paint systems of the invention may be applied to any desired substrates.

The substrates may be composed of any of a very wide variety of materials and combinations of materials. They consist preferably of metals such as steel, nickel, aluminum, magnesium, or titanium, or of alloys of these metals, or of plastics, which may have been fiber-reinforced, such as glass fiber-reinforced plastics (GRP), aramid fiber-reinforced plastics (ARP), carbon fiber-reinforced plastics (CRP), or natural fiber-reinforced plastics with hemp or sisal, for example. The substrate more preferably is of metal and/or plastic. In the sense of the invention, the term "metal" also includes alloys of different metals.

Substrates contemplated include, for example, rotorblades, aircraft or land vehicles, ships, buildings, or pipelines, or large machines, or parts of the aforementioned articles. Preferred substrates are rotorblades, especially those of wind turbines, helicopters, or ship's screws, and also aircraft such as airplanes, for example. Particularly suitable substrates are rotorblades of wind turbines and airplane components such as airplane bodies and parts thereof.

The invention additionally provides the aforementioned substrates coated with the composition of the invention and/or with the multicoat paint system of the invention.

The intention below is to illustrate the invention using examples.

EXAMPLES

Paint constituents used were as follows:

Materials used

| Component | Abbreviation and chemical designation |
| --- | --- |
| (A) | A1: aliphatic, branched OH-functional polyester with an OH number of 425 mg KOH/g (76% in butyl acetate)<br>A2: OH-functional polyester with an OH number of 266 mg KOH/g (77% in butyl acetate) |
| (B) | B1: linear, aliphatic polycarbonate diol with an OH number of 171 mg KOH/g |
| (C) | C1: polyisocyanate containing biuret groups with an NCO content of 23 wt % in the solids content (70 wt % strength solution in xylene)<br>C2: polyisocyanate containing biuret groups with an NCO content of 23 wt % in the solids content (70 wt % strength solution in methoxypropyl acetate)<br>C3: polyisocyanate containing biuret groups with an NCO content of 23 wt % in the solids content (90 wt % strength solution in methyl isobutyl ketone)<br>C4: polyisocyanate containing biuret groups with an NCO content of 23 wt % in the solids content (76 wt % strength solution in butyl acetate)<br>C1-V: polyisocyanate containing isocyanurate groups with an NCO content of 23 wt % in the solids content (70 wt % strength solution in xylene)<br>C2-V: polyisocyanate containing isocyanurate groups with an NCO content of 23 wt % in the solids content (70 wt % strength solution in methoxypropyl acetate)<br>CX-V: polyisocyanate containing isocyanurate groups with an NCO content of 23 wt % in the solids content (76 wt % strength solution in cyclohexanone/methoxypropyl acetate, 1/1) |
| (D) | D1: dimethyldichlorosilane-modified hydrophobic silica (filler)<br>D2: white pigment based on rutile<br>D3: anticorrosion pigment comprising zinc orthophosphate hydrate<br>D4: very fine talc (filler)<br>D5: pigmentary carbon black (black pigment)<br>D6: talc<br>D7: red iron oxide pigment |
| (E) | E1: isocyanate-crosslinking epoxy-functional acrylic resin (72 wt % strength in xylene/Shellsol A/Butoxyl, 2/2/1)<br>E2: epoxy resin based on bisphenol A and epichlorohydrin (75 wt % strength in xylene)<br>E1-V: styrene-free adhesion resin based on polyester (60 wt % strength in butyl acetate) |
| (F) | F1: block copolymer with amine groups (30 wt % strength in methoxypropyl acetate/butyl acetate, 6/1) (wetting and dispersing agent)<br>F2: polyether-modified polymethylalkylsiloxane (52 wt % strength in alkylbenzene/butyrolactone, 1/1), surface additive<br>F3: polysiloxane-based defoamer (52 wt % strength in alkylbenzene)<br>F4: polyacrylate solution (51 wt % strength), flow control and deaerating agent<br>F5: modified urea (52 wt % strength in dimethyl sulfoxide), rheological additive<br>F6: polyacrylate-based flow control agent (75 wt % strength in dibasic ester)<br>F7: silicone-free defoamer<br>F8: 3-glycidyloxypropyltrimethoxysilane<br>F9: dimethyltin dineodecanoate (catalyst)<br>F10: bismuth(III) neodecanoate<br>F11: mixture of bis(1,2,2,6,6-pentamethyl-4-piperidyl) sebacate and methyl 1,2,2,6,6-pentamethyl-4-piperidyl sebacate (light stabilizer additive)<br>F12: UV absorber based on a hydroxyphenyltriazine (85 wt % strength) |

Also employed, in addition to the solvents already present in certain commercial products, were the following organic solvents: L1: acetylacetone, L2: butyl acetate, L3: cyclohexanone, L4: methoxypropyl acetate, and L5: methyl isobutyl ketone.

OH numbers and NCO contents and the like in the table above are always based on the active ingredient or solid without solvents.

The materials listed above were used to produce a variety of inventive and noninventive coating material compositions as per tables 1 to 4 below. Noninventive materials and noninventive coating material compositions are denoted by the addition of "—V", as comparative materials and compositions.

The numerical data in the tables of the formulas of the coating material compositions correspond to the parts by weight of the materials that were used. "Al=10", for example, thus means that 10 parts by weight of a 76 wt % strength solution of the aliphatic, branched, OH-functional polyester with an OH number of 425 mg KOH/g in butyl acetate were used. All parts by weight in the formulas below add up in each case to 100 parts by weight. In the case of "Al=10" (76 wt % strength in butyl acetate), this means that 7.6 wt % of a hydroxy-functional polyester (A) having an OH number of 425 mg KOH/g are present in the coating material composition.

TABLE 1

Clearcoats

| Components | KL1 | KL1-V | KL2 | KL2-V | KL3 | KL4 |
|---|---|---|---|---|---|---|
| A1 | 24.65 | 24.65 | — | — | — | — |
| A2 | — | — | 29.44 | 29.44 | 26.67 | 26.67 |
| B1 | 9.30 | 9.30 | 11.11 | 11.11 | 13.89 | 13.89 |
| C1 | 53.50 | — | 44.44 | — | 44.44 | — |
| C1-V | — | 53.50 | — | 44.44 | — | — |
| C2 | — | — | — | — | — | 44.44 |
| F1 | 0.47 | 0.47 | 0.56 | 0.56 | 0.56 | 0.56 |
| F2 | 0.05 | 0.05 | 0.06 | 0.06 | 0.06 | 0.06 |
| F9 | 0.28 | 0.28 | 0.33 | 0.33 | 0.33 | 0.33 |
| F10 | 0.19 | 0.19 | 0.22 | 0.22 | 0.22 | 0.22 |
| F11 | 0.70 | 0.70 | 0.83 | 0.83 | 0.83 | 0.83 |
| F12 | 0.70 | 0.70 | 0.83 | 0.83 | 0.83 | 0.83 |
| L1 | 0.47 | 0.47 | 0.56 | 0.56 | 0.56 | 0.56 |
| L2 | 9.69 | 9.69 | 11.62 | 11.62 | 11.61 | 11.61 |
| Total | 100.00 | 100.00 | 100.00 | 100.00 | 100.00 | 100.00 |

The inventive clearcoats KL1 and KL2 differ from the noninventive clearcoats KL1-V and KL2-V in that in the noninventive examples a polyisocyanate containing isocyanurate groups was used rather than a polyisocyanate containing biuret groups. The inventive clearcoats KL1 and KL2 differ from one another in the choice of different inventively employable components (A), while the inventive clearcoats KL3 and KL4 differ in the choice of different inventively employable polyisocyanates (C) containing biuret groups.

TABLE 2

Basecoats

| Components | BL1 | BL1-V | BL2 | BL2-V | BL3 | BL3-V | BL4 | BL4-V |
|---|---|---|---|---|---|---|---|---|
| A1 | 17.96 | 17.96 | — | — | — | — | — | — |
| A2 | — | — | 20.41 | 20.41 | 20.41 | 20.41 | 22.45 | 22.45 |
| B1 | 7.78 | 7.78 | 8.84 | 8.84 | 8.84 | 8.84 | 6.80 | 6.80 |
| C1 | 40.11 | — | 31.97 | — | — | — | — | — |
| C1-V | — | 40.11 | — | 31.97 | — | — | — | — |
| C2 | — | — | — | — | 31.97 | — | 31.97 | — |
| C2-V | — | — | — | — | — | 31.97 | — | 31.97 |
| D1 | 0.30 | 0.30 | 0.34 | 0.34 | 0.34 | 0.34 | 0.34 | 0.34 |
| D2 | 21.86 | 21.86 | 24.83 | 24.83 | 24.83 | 24.83 | 24.83 | 24.83 |
| F1 | 1.20 | 1.20 | 1.36 | 1.36 | 1.36 | 1.36 | 1.36 | 1.36 |
| F2 | 0.06 | 0.06 | 0.07 | 0.07 | 0.07 | 0.07 | 0.07 | 0.07 |
| F9 | 0.24 | 0.24 | 0.27 | 0.27 | 0.27 | 0.27 | 0.27 | 0.27 |
| F10 | 0.18 | 0.18 | 0.20 | 0.20 | 0.20 | 0.20 | 0.20 | 0.20 |
| F11 | 0.90 | 0.90 | 1.02 | 1.02 | 1.02 | 1.02 | 1.02 | 1.02 |
| F12 | 0.90 | 0.90 | 1.02 | 1.02 | 1.02 | 1.02 | 1.02 | 1.02 |
| L1 | 0.60 | 0.60 | 0.68 | 0.68 | 0.68 | 0.68 | 0.68 | 0.68 |
| L2 | 2.99 | 2.99 | 3.40 | 3.40 | 3.40 | 3.40 | 3.40 | 3.40 |
| L4 | 3.12 | 3.12 | 3.55 | 3.55 | 3.55 | 3.55 | 3.55 | 3.55 |
| L5 | 1.80 | 1.80 | 2.04 | 2.04 | 2.04 | 2.04 | 2.04 | 2.04 |
| Total | 100.00 | 100.00 | 100.00 | 100.00 | 100.00 | 100.00 | 100.00 | 100.00 |

The inventive basecoats BL1, BL2, BL3, and BL4 differ from the noninventive basecoats BL1-V, BL2-V, BL3-V, and BL4-V in that in the noninventive examples polyisocyanates containing isocyanurate groups were used rather than polyisocyanates containing biuret groups. The inventive basecoat BL1 differs from the inventive basecoat BL2 in the choice of a different inventively employable component (A), while the inventive basecoat BL2 differs from the inventive basecoats BL3 and BL4 in the choice of a different inventively employable polyisocyanate (C) containing biuret groups.

TABLE 3

Use as adhesion-promoting coating for refinishing

| Components | HL1 | HL2 | HL3 | HL4 |
|---|---|---|---|---|
| A1 | 12.84 | 12.84 | 12.75 | 12.75 |
| B1 | 8.57 | 8.57 | 8.50 | 8.50 |
| C3 | 28.33 | 28.33 | 28.33 | 28.33 |
| D1 | 0.27 | 0.27 | 0.27 | 0.27 |
| D2 | 13.93 | 13.93 | 13.82 | 13.82 |
| D3 | 5.09 | 5.09 | 5.05 | 5.05 |
| D4 | 3.21 | 3.21 | 3.19 | 3.19 |
| D5 | 0.11 | 0.11 | 0.11 | 0.11 |
| E1 | — | 5.95 | — | 5.95 |
| E1-V | 5.95 | — | 5.95 | — |
| F1 | 0.54 | 0.54 | 0.53 | 0.53 |
| F2 | 0.11 | 0.11 | 0.11 | 0.11 |
| F3 | 0.03 | 0.03 | 0.03 | 0.03 |
| F6 | 0.38 | 0.38 | 0.37 | 0.37 |
| F8 | 0.16 | 0.16 | 0.59 | 0.59 |
| F9 | 0.05 | 0.05 | 0.05 | 0.05 |

TABLE 3-continued

Use as adhesion-promoting coating for refinishing

| Components | HL1 | HL2 | HL3 | HL4 |
|---|---|---|---|---|
| L1 | 3.46 | 3.46 | 3.46 | 3.46 |
| L2 | 7.51 | 7.51 | 7.47 | 7.47 |
| L4 | 8.31 | 8.31 | 8.27 | 8.27 |
| L5 | 1.15 | 1.15 | 1.15 | 1.15 |
| Total | 100.00 | 100.00 | 100.00 | 100.00 |

The adhesion promoter coatings HL1 to HL4 are all inventive. HL1 and HL2 differ from one another by HL2 comprising the inventively advantageous component (E), whereas HL1 uses a polyester-based adhesion promoter instead. The same applies in respect of coatings HL3 and HL4, with coating material HL4 comprising the inventively advantageously employable component (E). In comparison to HL1 and HL2, HL3 and HL4 also contain larger amounts of the adhesion-boosting silane F8.

TABLE 4

Surfacer compositions

| Components | F1 | F2 | F2-V |
|---|---|---|---|
| A1 | 12.67 | 18.24 | 18.24 |
| B1 | 9.33 | 2.52 | 2.52 |
| C4 | 33.33 | 37.11 | — |
| CX-V | — | — | 37.11 |
| D1 | 0.67 | 0.63 | 0.63 |
| D2 | 13.00 | 12.26 | 12.26 |
| D3 | 4.87 | 4.59 | 4.59 |
| D6 | 8.00 | 7.55 | 7.55 |
| D7 | 0.67 | 0.63 | 0.63 |
| E2 | 3.33 | 3.14 | 3.14 |
| F1 | 0.67 | 0.63 | 0.63 |
| F2 | 0.20 | 0.19 | 0.19 |
| F4 | 0.53 | 0.50 | 0.50 |
| F5 | 0.20 | 0.19 | 0.19 |
| F7 | 0.07 | 0.06 | 0.06 |
| F8 | 0.20 | 0.19 | 0.19 |
| F9 | 0.40 | 0.38 | 0.38 |
| F10 | 0.20 | 0.19 | 0.19 |
| L1 | 1.00 | 0.94 | 0.94 |
| L3 | 2.00 | 1.89 | 1.89 |
| L4 | 8.66 | 8.17 | 8.17 |
| Total | 100.00 | 100.00 | 100.00 |

The inventive surfacer compositions F1 and F2 differ significantly in the ratio of components (A) and (B) to one another and also, in particular, in the absolute amount of (B) used. The inventive surfacer composition F2 differs from the noninventive composition F2-V in that the former contains a polyisocyanate containing biuret groups, while the latter comprises a polyisocyanate containing isocyanurate groups.

Application of the Coating Materials
Substrate Preparation

The substrates selected were as follows: aluminum (pure aluminum pickled for 4 minutes at room temperature with 16 wt % strength aqueous sodium hydroxide solution and then for 2 minutes with nitric acid, subsequently washed with water and cleaned); aluminum alloy 2024 (plated or unplated and pickled, washed, and cleaned according to the above method); aluminum alloy 2024 (plated or unplated; chromic acid anodized or tartaric-sulfuric acid anodized); pure titanium (abraded with 180 grade); stainless steel (V2A and V4A abraded with 180 grade and acid-pickled); epoxy resin plates (glass fiber-reinforced and carbon fiber-reinforced, abraded with 180 grade); polyurethane and polyurea substrates (cleaned with isopropanol or abraded).

Application as Primer

The substrates were coated with the compositions of the specified examples, using a gravity feed gun, by spray application (dry film thickness on aluminum: about 20-25 µm, dry film thickness on steel: about 50 µm; dry film thickness on nickel: about 50 µm) and after drying were coated with a topcoat (Glasurit 68 Line, High Solids 2K-CV topcoat, RAL 9016; dry film thickness 70 µm).

Application as Intermediate Coat

As a primer, a polyurethane primer (Glasurit CV Universal primer-surfacer; 60 µm dry film thickness) was spray-applied to the substrate, after which the compositions of the examples were spray-applied, and then a topcoat (Glasurit 68 Line, High Solids 2K-CV topcoat, RAL 9016; dry film thickness 70 µm) was applied.

Application as Topcoat

The procedure was the same as for the application as intermediate coat, but without the application of the topcoat described there—in other words, the inventive coating materials themselves form the topcoat.

Application as Clearcoat

The procedure used was the same as for the application as topcoat, except that rather than an inventive pigmented paint an inventive clearcoat was used as topcoat.

Performance Tests

Strippability (with a Stripper/Restripper Suitable for the Airplane Industry)

Two samples are dried at room temperature for 7 days. One of the samples is aged additionally for 96 hours at 70° C., after which the samples are each removed using a stripper suitable for the aircraft industry (Turco® 1270-5 stripper, based on benzyl alcohol; available from Henkel Technologies). This is done by wetting each sample with the stripper. There follows a maximum seven-hour exposure time. The swollen material can subsequently be removed from the substrate using commercial cloths, sponges, spatulas, or the like. Effectiveness varies according to system, paint construction, and film thicknesses, and so removability much earlier than after 7 hours is also possible. Evaluation is in accordance with the +/−principle: "+"=material removable after no later than seven hours, "−"=material not removable after 7 hours, "○"=material only partly removable within the exposure period of seven hours.

Clemens Scratch Hardness Testing Before and after Skydrol Exposure

After the coatings have dried at room temperature for 7 days, the scratch hardness is determined by means of a scratch stylus which runs automatically over the coating while constantly increasing its load. A triplicate determination should be carried out here.

The instrument used is from Erichsen (Sikkens model 601 scratch hardness tester). The samples are subsequently stored in Skydrol for 42 days at room temperature. A scratch hardness test is then carried out again as described above.

Determination of Tensile Adhesion

After drying of the coatings at room temperature for 7 days, a test die is adhered to the coating. After 24 hours of through-drying, or 24 hours of through-drying followed by 4 days of storage at 70° C. and 100% humidity, a tensile testing machine is used to pull the sample slowly and uniformly, perpendicularly to the substrate, until fracture takes place. Critical here is not only the measurement value, which is reported in $N/mm^2$, but also the description of the fracture mode: adhesive fracture (between two coats) or cohesive fracture (within one coat).

UV Weathering

Prior to UV weathering, the parameters specified above (see description) are measured. A QUV-Lab instrument (model: QUV/SE) is used. The effect of sunlight, and also dew and rain, is simulated. Irradiation with UV light is at 60° C., and weathering with condensed water at 40° C. Each cycle here lasts 4 hours. Depending on requirement, the samples remain in the test apparatus for 1000 h, 2000 h, or 3000 h. After that, the measurements specified above are repeated.

Shade Measurement

The shade is measured using a shade measuring instrument from Largo with the program Largo Match 2000.

Test Results

TABLE 5

Test results for the clearcoats from table 1

| Tests | KL1 | KL1-V | KL2 | KL2-V | KL-3 | KL-4 |
|---|---|---|---|---|---|---|
| Strippability | | | | | | |
| | + | ○ | + | ○ | + | + |
| Clemens scratch hardness (in kg) on aluminum substrate before/after Skydrol exposure | | | | | | |
| Film thickness in μm | 49.8 | 57.6 | 45.9 | 47.4 | 39.9 | 38.4 |
| before exposure | 4.5 | 3.5 | 3.2 | 1.9 | 4.8 | 4.6 |
| after exposure (35 d) | 2.7 | 2.3 | 1.9 | — | 2.2 | 2.1 |

Table 5 shows that the inventive clearcoats are fully strippable, whereas full strippability is not ensured for the noninventive clearcoats, which comprise an unsuitable polyisocyanate. Furthermore, from direct comparisons of KL1 with KL1-V and of KL2 with KL2-V, it is clearly apparent that even with a lower film thickness, the inventive coatings KL1 and KL2 possess higher scratch hardnesses before and after Skydrol exposure.

TABLE 6

Test results for the basecoats from table 2

| Tests | BL1 | BL1-V | BL2 | BL2-V | BL3 | BL3-V | BL4 | BL4-V |
|---|---|---|---|---|---|---|---|---|
| Strippability | | | | | | | | |
| | + | ○ | + | ○ | + | ○ | + | ○ |
| Clemens scratch hardness (in kg) on aluminum substrate before/after Skydrol exposure | | | | | | | | |
| Film thickness in μm | 30.2 | 33.7 | 30.7 | 27.9 | 30.1 | 28.4 | 36.0 | 38.8 |
| before exposure | 8.6 | 7.8 | >8.9 | 8.5 | 8.7 | 8.1 | >8.9 | 7.3 |
| after exposure | 4.6 | 2.3 | 5.0 | 2.5 | 4.3 | 1.6 | 4.3 | 2.0 |
| Shade after UV weathering | | | | | | | | |
| dL | −0.39 | −0.45 | −0.30 | −0.35 | −0.44 | −0.51 | −0.36 | −0.42 |
| da | −0.26 | −0.33 | −0.24 | −0.28 | −0.37 | −0.46 | −0.28 | −0.34 |
| db | 0.79 | 0.84 | 0.80 | 0.87 | 0.86 | 0.96 | 0.83 | 1.02 |
| dE | 0.84 | 0.96 | 0.83 | 0.85 | 0.92 | 1.01 | 0.94 | 1.07 |

Table 6 shows that the basecoats comprising fillers and pigments likewise possess effective strippability only when a polyisocyanate containing biuret groups has been used. The comparison of basecoats BL1 and BL2 shows that even when different components (A) are employed, outstanding results are achieved. Furthermore, from direct comparisons of BL1 with BL1-V, of BL2 with BL2-V, of BL3 with BL3-V, and of BL4 with BL4-V, it is clearly apparent that the inventive paints BL1, BL2, BL3, and BL4 possess higher scratch hardnesses before and after Skydrol exposure. Moreover, the deviations in shade in the inventive paints after UV weathering are much lower than for the noninventive basecoats.

TABLE 7

Test results for the paints from table 3

| Test | Substrate | HL1 | HL2 | HL3 | HL4 |
|---|---|---|---|---|---|
| Strippability | | | | | |
| | | + | + | + | + |
| Tensile adhesion in N/mm² | | | | | |
| after 1 day RT | Nickel | 2.06 | 3.46 | 3.52 | 5.32 |
| | V2A steel | 1.78 | 3.69 | 3.36 | 4.66 |
| | aluminum, pickled | 4.38 | 5.21 | 5.89 | 7.36 |
| after 1 day RT and 4 days 70° C., 100% humidity | Nickel | 2.89 | 5.16 | 3.59 | 12.78 |
| | V2A steel | 2.80 | 4.89 | 3.73 | 10.93 |
| | aluminum, pickled | 3.65 | 9.63 | 5.52 | 14.93 |

All of the samples tested in table 7 are inventive and exhibit outstanding stripping behavior. For all of the samples, in the case of the stated exposure, there was a 100% adhesive fracture between primer and substrate. Formulations HL2 and HL4, however, comprise an epoxy-functional acrylic resin in accordance with inventively employable component (E), while formulations HL1 and HL3 comprise a polyester-based adhesion resin. The paints additized with epoxy-functional acrylate resins exhibit a significantly better tensile adhesion behavior in the coatings obtained from the inventive coating materials. The tensile adhesive strength can be increased further, moreover, by adding larger amounts of a silane, as is clearly apparent from a comparison of HL1 with HL3 and of HL2 with HL4.

TABLE 8

Test results for the surfacers from table 4

| Test | F1 | F2 | F2-V |
|---|---|---|---|
| Strippability | + | + | o |

The inventive surfacers exhibit a significantly better stripping behavior than the noninventive surfacer F2-V.

What is claimed is:

1. A coating material composition, comprising:
    a hydroxyl-containing polyester (A) which has an OH number of from 250 to 660 mg KOH/g,
    a polycarbonate diol (B) which has an OH number of from 35 to 500 mg KOH/g, and which is present in an amount of from 2 to 14 wt %, based on the total weight of the coating material composition, and
    a polyisocyanate (C) comprising a biuret group which has an isocyanate group content of from 5.8 to 27 wt %, based on the total weight of the polyisocyanate (C),
    wherein the hydroxyl-containing polyester (A) is different from the polycarbonate diol (B), and
    wherein the coating material composition comprises less than 420 g/l of organic solvents as a fraction, and from 40 to 100 wt % of binders, based on a solids content.

2. The coating material composition according to claim 1, wherein the hydroxyl-containing polyester (A) is aliphatic, branched or a mixture thereof.

3. The coating material composition according to claim 1, wherein the polycarbonate diol (B) is aliphatic, linear or a mixture thereof.

4. The coating material composition according to claim 1, wherein the polycarbonate diol (B) has an OH number of from 100 to 250 mg KOH/g.

5. The coating material composition according to claim 1, wherein the polyisocyanate (C) comprising a biuret group is aliphatic.

6. The coating material composition according to claim 1, wherein the polyisocyanate (C) comprising a biuret group is obtained from hexamethylene diisocyanate, isophorone diisocyanate, or a mixture thereof.

7. The coating material composition according to claim 1, wherein the polyisocyanate (C) comprising a biuret group has an isocyanate group content of from 15 to 26 wt % based on the total weight of the polyisocyanate (C).

8. The coating material composition according to claim 1, further comprising:
    a component (D) which comprises a pigment, a filler, or a mixture thereof both.

9. The coating material composition according to claim 8, wherein the pigment, when present, is at least one selected from the group consisting of a color-imparting pigment, effect-imparting pigment, color- and effect-imparting pigment, and anticorrosion pigment, and wherein the filler, when present, is at least one selected from the group consisting of silicate, silica, and calcium carbonate.

10. The coating material composition according to claim 1, further comprising:
    a component (E) which comprises at least one epoxy resin or a mixture of at least one epoxy resin and at least one hydroxy-functional acrylate resin.

11. The coating material composition according to claim 1, further comprising:
    a binder that is different from the hydroxyl-containing polyester (A), from the polycarbonate diol (B), and from the polyisocyanate (C) comprising a biuret group.

12. The coating material composition according to claim 1, wherein a ratio of hydroxyl groups of the hydroxyl-containing polyester (A) and the polycarbonate diol (B) to isocyanate groups of the polyisocyanate (C) is from 1:1.1 to 1:1.5.

13. The coating material composition according to claim 8, further comprising:
    a binder that is different from the hydroxyl-containing polyester (A), the polycarbonate diol (B), the polyisocyanate (C), and the component (D).

14. The coating material composition according to claim 10, further comprising:
    a binder that is different from the hydroxyl-containing polyester (A), the polycarbonate diol (B), the polyisocyanate (C), and the component (E).

15. The coating material composition according to claim 10, wherein a ratio of hydroxyl groups of the hydroxyl-containing polyester (A), polycarbonate diol (B), and the component (E) to isocyanate groups of the polyisocyanate (C) is from 1:1.1 to 1:1.5.

16. A primer composition, a topcoat composition, or a clearcoat composition for coating a metallic substrate, a plastic substrate or a combination thereof, the composition comprising the coating material composition according to claim 1.

17. A substrate coated with a chemically crosslinked coating material obtained by curing the coating material composition according to claim 1, wherein the substrate comprises at least one selected from the group consisting of a metal and a plastic.

18. The substrate according to claim 17, wherein the substrate is selected from the group consisting of an airplane body, a rotor blade of a wind energy system, a ship's hull, and a machine.

19. A method for producing a multicoat coating, the method comprising:
    applying at least one primer composition to a substrate,
    applying at least one topcoat composition to the substrate coated with the at least one primer composition,
    optionally applying at least one clear coat composition to the substrate coated with the at least one primer composition and the at least one topcoat composition, and
    chemically crosslinking at least one selected from the group consisting of the at least one primer composition, the at least one topcoat composition, and the at least one clear coat composition,
    wherein the at least one primer composition, the at least one topcoat composition, the at least one clearcoat composition, or a combination thereof is the coating material composition according to claim 1, and
    wherein the substrate is at least one selected from the group consisting of a metal substrate and a plastic substrate.

20. The method according to claim 19, comprising applying the at least one clear coat composition to the substrate coated with the at least one primer composition and the at least one topcoat composition.

* * * * *